United States Patent
McGarity et al.

(10) Patent No.: US 11,526,346 B1
(45) Date of Patent: Dec. 13, 2022

(54) ZERO DOWNTIME APPLICATION PACKAGE DEPLOYMENT

(71) Applicant: ORACLE INTERNATIONAL CORPORATION, Redwood Shores, CA (US)

(72) Inventors: Brett W. McGarity, Aurora, CA (US); Janet A. Rans, Nevada, IA (US); Steven M. Fillipi, Aurora, CO (US); Clayton Seeley, Lone Tree, CO (US); Susan A. Smith, Highlands Ranch, CO (US); David Bilthuis, Highlands Ranch, CO (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/526,494

(22) Filed: Nov. 15, 2021

(51) Int. Cl.
    *G06F 9/44*     (2018.01)
    *G06F 8/656*     (2018.01)
    *G06F 9/445*     (2018.01)

(52) U.S. Cl.
    CPC .......... *G06F 8/656* (2018.02); *G06F 9/44521* (2013.01)

(58) Field of Classification Search
    CPC ......... G06F 8/60; G06F 8/656; G06F 9/44521
    USPC .......................................................... 717/170
    See application file for complete search history.

(56) References Cited

U.S. PATENT DOCUMENTS

| | | | | |
|---|---|---|---|---|
| 6,006,034 A | * | 12/1999 | Heath | G06F 8/65 717/170 |
| 6,223,345 B1 | | 4/2001 | Jones et al. | |
| 7,210,143 B2 | | 4/2007 | Or et al. | |
| 7,246,351 B2 | * | 7/2007 | Bloch | H04L 9/40 717/169 |
| 7,886,270 B2 | | 2/2011 | Dryfoos et al. | |
| 10,871,962 B2 | * | 12/2020 | Burkhardt | H04L 67/34 |
| 11,119,745 B2 | | 9/2021 | Troutman et al. | |
| 11,157,253 B1 | | 10/2021 | Shteyman et al. | |
| 11,169,833 B2 | | 11/2021 | Shetty et al. | |
| 11,269,620 B1 | * | 3/2022 | Hoeft | G06F 8/656 |
| 2004/0123285 A1 | * | 6/2004 | Berg | G06F 11/1438 714/E11.135 |

(Continued)

OTHER PUBLICATIONS

Title: The SimpleScalar tool set, version 2.0, author: D Burger, published on 1997.*

(Continued)

*Primary Examiner* — Chameli Das
(74) *Attorney, Agent, or Firm* — Kraguljac Law Group, LLC (57) ABSTRACT

Systems, methods, and other embodiments associated with deploying application packages are described. In one embodiment, a current version of an application package is stored. An enterprise server deploys the current version. Upon a first user signing on to the enterprise server, providing the first user with access to the current version. A modified version of an application package is stored and deployed. Upon a second user signing on to the enterprise server, providing the second user with access to the modified version. The current version and the modified version are simultaneously active on the enterprise server. Subsequent users that sign on are only given access to the modified version and are not permitted access to the current version. Upon the first user signing out, deleting the current version, and causing the modified version to become a new current version.

20 Claims, 4 Drawing Sheets

(56) References Cited

U.S. PATENT DOCUMENTS

| | | | |
|---|---|---|---|
| 2014/0173582 A1* | 6/2014 | Hofhansl | G06F 8/61 |
| | | | 717/170 |
| 2016/0170747 A1* | 6/2016 | Luettge | G06F 8/656 |
| | | | 717/121 |
| 2017/0075663 A1* | 3/2017 | Jordan | G06F 8/658 |
| 2022/0091858 A1* | 3/2022 | Chivukula | H04L 63/0807 |

OTHER PUBLICATIONS

Title: Venti: A new approach to archival data storage, author: S Quinlan, published on 2002.*
Title: : Zero-downtime SQL database schema evolution for continuous deployment; author: M De Jong, published on 2017.*
Title: Evolving NoSQL databases without downtime, author: K Saur, published on 2016.*

* cited by examiner

ZERO DOWNTIME APPLICATION PACKAGE DEPLOYMENT

BACKGROUND

An application package is a collection of software programs that have been designed for the purpose of supporting commonly performed business functions. A typical application package includes application specifications and logic. In prior techniques, in order to deploy a new application package, it is necessary to halt existing activity (batch jobs and interactive work) on the enterprise server upon which the current application package is located so that the new application package, particularly the new application specifications and logic, can be deployed by the enterprise server. In this prior technique, the current application package is then overwritten and replaced by the new or modified application package. Consequently, the prior technique interrupts daily business for interactive users and batch processes which decreases productivity during these downtime windows.

As an alternative, system administrators had to deploy the new application package during "slow" or off-hour times, in order to minimize any downtime disruption to the end users. In either instance, deploying a new or modified application package caused downtime in the system and users were not able to access the application package.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Systems and methods are described herein that implement a deployment technique for deploying a new version of an application package into a live system that currently runs an active, current version of the application package. In one embodiment, the deployment technique allows for multiple versions (multiple packages) of an application to be available and active on an enterprise server simultaneously. Thus, end users experience zero downtime in accessing the application package, thereby improving previous systems. Furthermore, since multiple versions of the application package are made active, the present deployment technique does not need to obtain a "lock" on services associated with the current active version in order to deploy the new version.

The term "application package" or "package" is intended to cover and include other forms and organizations of software applications other than the examples described herein. A "package" in general may include artifacts of files and objects that contain executable code, data, libraries, etc that are part of a software application and may be organized differently for different computing environments or platforms. Deployment processes of such packages may also be performed differently for different computing environments or platforms as is understood by those of ordinary skill in the art. The present deployment techniques are not limited to the specific details, or the illustrative examples shown and described herein. Thus, this disclosure and claims are intended to embrace alterations, modifications, and variations including equivalents that may be made to this disclosure.

In one embodiment, the present technique controls how end users sign-on and access different versions of the application package based upon the time that the end users sign-on to the system in relation to the newest deployed package version. The current version of the application package is removed and replaced with the modified version of the application package when the last end user that is signed-on to the current application package signs-out of that last end user's session.

In one embodiment, the present technique configures different directory structures for the current application package and the new/modified application package. This causes the current application package and the modified application package to be stored and maintained in different directory locations on the same storage system that are part of the enterprise server. This improves prior techniques that deploy different versions on different server systems, which requires additional hardware (multiple servers) and more complex control and coordination between the servers. As will be described in the present technique, the storage locations of the different versions are related by having some overlapping pathcodes, which are paths that lead to locations of the package versions on the storage system. For example, two locations that have overlapping pathcodes include pathcodes that have a portion of the path (or location/address identifier) in common. The present technique allows for the deployment of the current application package and the modified application simultaneously so that there is zero downtime when the current application package is replaced by the modified application package.

Figure 1:
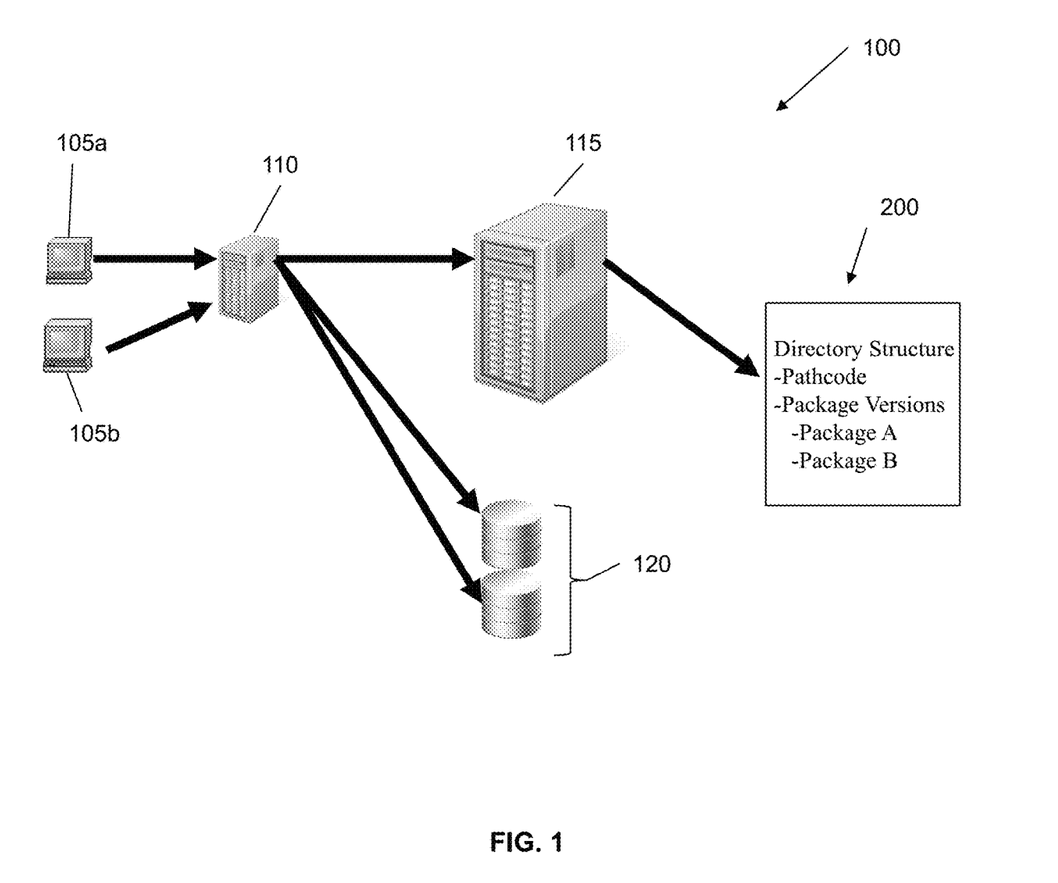
FIG. 1 illustrates one embodiment of a system for deploying multiple versions of an application package.

With reference to FIG. 1, a system 100 is illustrated that describes one embodiment for deploying a modified application package. The system 100 includes, in part, HTML server 110, enterprise server 115, storage system 120, and application package directory structures 200. The system 100 provides network access to one or more end users 105*a* and 105*b* via the HTML server 110.

Figure 2:
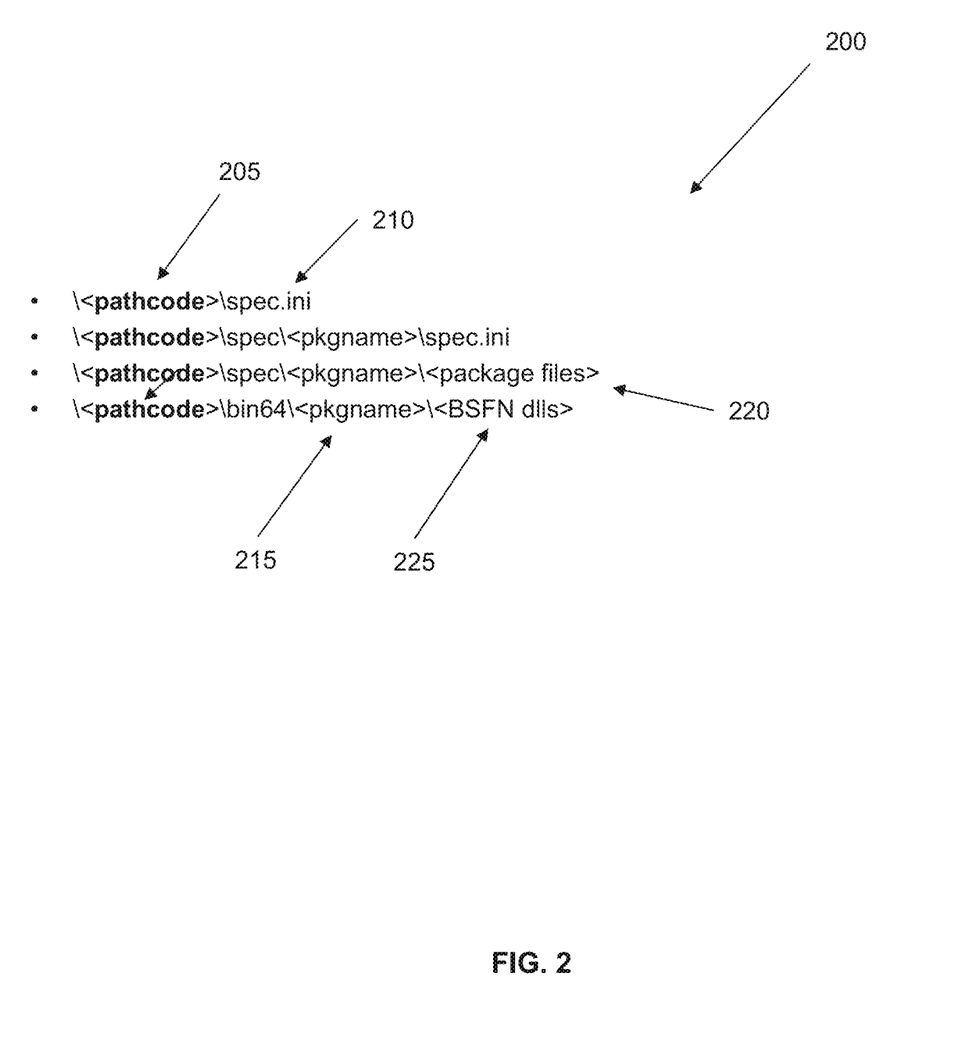
FIG. 2 is a schematic illustration of the directory structure of the application package deployment system in one embodiment.

With reference to FIG. 2, there is illustrated an exemplary application package directory structure 200. Application package directory structure 200 includes, in part, a pathcode 205, specification initialization file 210 (file name spec.ini), package name 215, package files 220, and business function dynamic link library files (BSFN DLLs) 225. In one embodiment, specification initialization file 210 is a type of file that contains file configuration information about the associated application package (e.g., current package version, status, etc.). Package files 220 are files that include code, data, and other objects/artifacts that may be used by the package.

Business function dynamic link library files (BSFN DLLs) 225 are files that contain information about how to carry out functions for an application.

The configuration of application package directory structure 200 is an improvement to the application package deployment process. As will be discussed in greater detail later, the application package directory structure 200 for the current version of the application package is stored in a directory in the storage device 120. The path code 205 identifies the parent/child directories leading to a unique subdirectory name that represents the package name of the current version of the application package.

For example, the unique subdirectory name is the package name of the current version of the application package (e.g., package name is "Package A"). Each new version of the application package will have a unique package name even though all versions are for the same application package (e.g., all are versions of an invoicing application). For example, an invoicing application may have multiple versions where each version has a unique application package name. Thus, the pathcode combined with the package name identify the path to that directory on the storage device that contains the files of the associated package. In other words, pathcode combined with the package name forms a directory path on the storage device used to navigate to the location of the application package.

When a new version of the application package is created, a new subdirectory is created for the new version so that both versions of the application package can co-exist on the same storage system. The new version of the application package is given a different package name (e.g., "Package B") than the current version ("Package A") so that the new subdirectory name is assigned the package name of the new version. In one embodiment, the location of the new subdirectory is based on the same pathcode as the current version, but the pathcode is combined with the new package name. Thus, this leads to the location of the new subdirectory based on the package name "Package B."

In one embodiment, the pathcode is a string of one or more directories/subdirectories in a file system on a storage device. The pathcode is used to navigate to a particular location in the file system. For example, a pathcode may be: drive C: root directory > subdirectory 1 > subdirectory 2 > . . . subdirectory N>. When combined with the package name, the resulting path identifies the subdirectory of the associated version of the application package.

For example, below is shown how the application package directory structure 200 for the current version of the application package (Current Version-Package A) and the modified version of the application package (Modified Version-Package B) co-exist in two separate locations on the same storage system but share a common pathcode:
Application Directory Structures for Current ("Package A") and Modified "Package B") Versions
\<pathcode>\spec.ini
\<Pathcode>\sPec\<PackageA >\spec.ini
\<pathcode>\spec\<PackageA>\<PackageA files>
\<pathcode>\bin64\<PackageA>\<BSFN dlls>
\<pathcode>\spec\<PackageB>\spec.ini
\<pathcode>\spec\<PackageB>\<PackageB files>
\<pathcode>\bin64\<PackageB>\<BSFN dlls>

Stated in another way, suppose the pathcode is Drive C: root directory > subdirectory 1 > subdirectory 2 >. Then subdirectory 2 is configured to include unique and separate subdirectories/folders for each of the different versions of the application package (Package A and Package B), which contain the files for their corresponding version:

Drive C: root directory > subdirectory 1 > subdirectory 2 >
PackageName A subdirectory >
PackageName B subdirectory >

In one embodiment, the "spec" sub-directory identifies the specifications of the application package and may or may not be included as part of the pathcode. Other computing platforms may not implement a "spec" sub-directory or "spec.ini" file. Thus, this feature may be implemented in other ways based on the structure of the computing platform or environment in which the present deployment techniques are implemented.

In this manner, the same path code is used for the current version and the modified version of the application package directory structure 200. However, separate directories for different versions of the application package have been added by changing the package name from the name of the current version (Package A) of the application package to the name of the modified version of the application package (Package B). Consequently, both versions of the application package (the current version and the modified version) can be deployed at the same time and utilized by the end users. This results in zero downtime in deploying the modified version of the application package which is an improvement over previous techniques that require downtime.

As discussed earlier, a kernel in the enterprise server 115 can be used to deploy the different specifications and logic of the current and modified versions of the application packages by the package name for both the current and modified versions of the application package.

Non-Directory System Embodiment

In another embodiment, the pathcode may be revised for computing platforms or operating systems that do not use directories for storing files. In general, the pathcode is generated to identify how/where to find portions of an application package and thus uniquely reference/retrieve different versions the application package. In either a directory system or a non-directory system, the pathcode is an identifier used for storage/retrieval and is combined with the package name as described previously to find the associated package. In the non-directory system, the pathcode may be based on an addressing scheme or ID mechanism of the operating system that identifies files. In this case, the pathcode is not a true "location" as in a file system but is still a mechanism to navigate to and reference specific files or libraries in a storage system. This includes systems that store artifacts as objects and/or in libraries (e.g., IBMi system).

For example, to have two versions of a package, a unique library name is created to contain files/code/functions of the package version. The pathcode is a generated identifier that is combined with the package name to create a unique library name for a library that contains the associated package version. In another embodiment, the pathcode and at least of portion of the package name are combined to create the unique library name of the associated package. Using the IBMi system as an example, a full package build creates a unique library to contain business function objects. The unique library is identified by a unique library name and the library is considered the parent of the package.

In one embodiment, unique library names may include the first and last two (2) letters of the package name (or other combination of letters from package name, or the entire package name). A system job number/process ID (e.g., 6 digits in IBMi) is added/appended to the package letters to complete the unique library name. For example, Package Name=DV920FA, first and last two letters="DVFA", JobNumber=123456, Unique Library Name=DVFA<jobNumber> which becomes "DVFA123456" from the combination of portions of the package name and the job number. In another embodiment, the pathcode may be a unique identifier generated by the system that is not a job number.

If the generated library name already exists in the system, then the system changes a letter in the name and reverifies if unique. For example, the last character of the library name is changed to 'A' (e.g., DVFA123456 becomes DVFA12345A). If DVFA12345A exists, the last character is changed to the next alpha character (e.g., DVFA12345B) etc., until the library name is unique. Unique library names may be stored in a database table for verification and/or identification. In one embodiment, parent package unique library is used for update package builds. Package library is "active/deployed" library.

The unique library name for the newest version of the package may then be stored in a configuration file so that the system can identify the newest version that is active on the system. This in turn is used to control which package version a user is given access to when the user requests access to the application package as described herein.

Deploying New Version of Application Package

Figure 3:
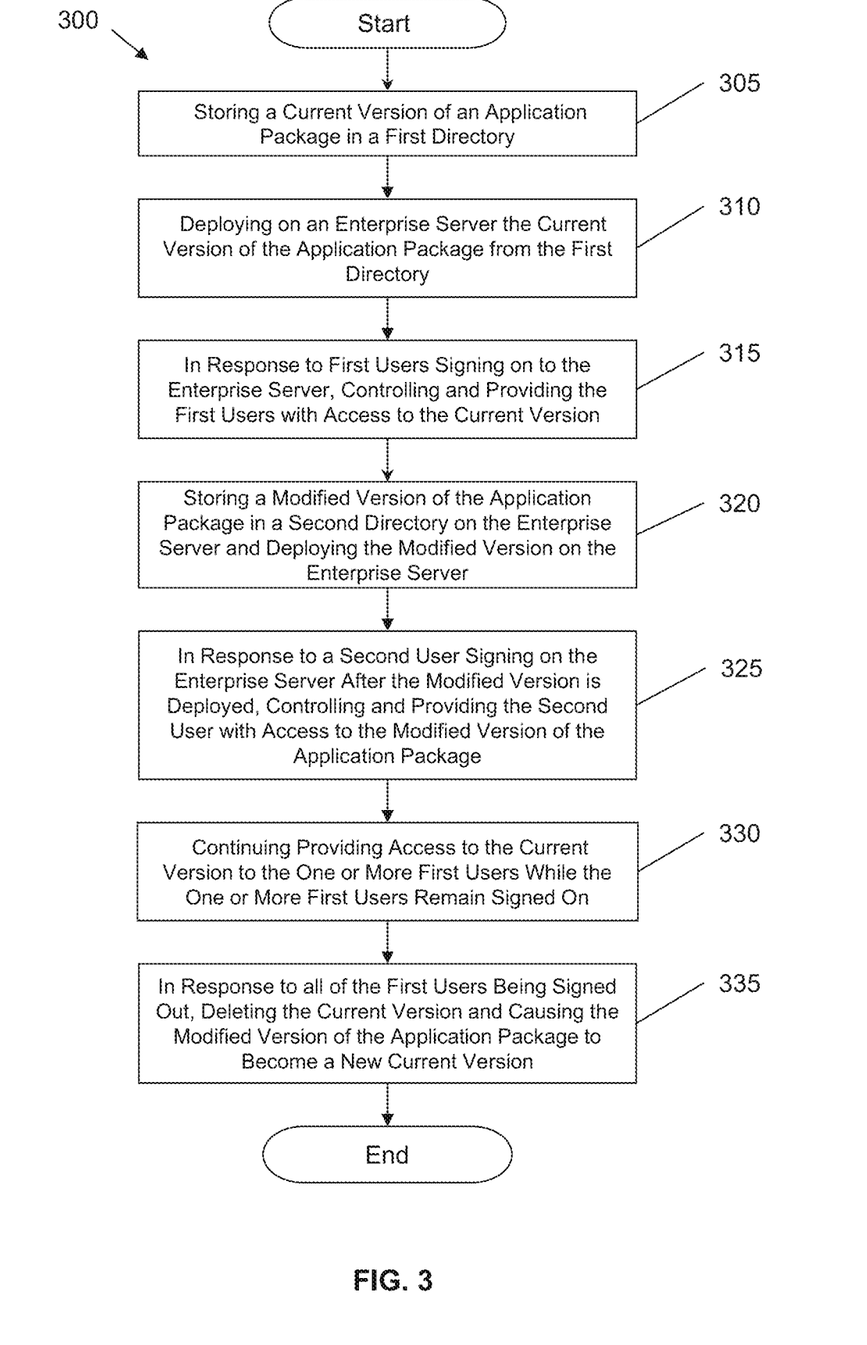
FIG. 3 illustrates one embodiment for a method for deploying multiple versions of an application package.

With reference to FIG. 3, a computer-implemented method 300 is illustrated that describes one embodiment for deploying a modified application package. The method 300 is performed by at least a processor of a computer system that accesses and interacts with memories and/or data storage devices. For example, the processor at least accesses and reads/writes data to the memory and processes network communications to perform the actions of FIG. 3. Method 300 is described from the perspective of initially deploying an application package and then subsequently, a modified version of the application package is deployed on the same system.

With reference to FIG. 3, at 305, the method 300 is initiated when a system administrator stores a current version of an application package (e.g., Package A) in a directory (or location) in storage device 120. The current version of the application package is input into the storage device 120 at a location identified by a pathcode combined with the package name of the current version.

In step 310, after the current version of the application package (e.g., Package A) is located on the storage device 120, the enterprise server 115 deploys the current version of the application package on the system. After deployment, the current version of the application package is active on the system and can be accessed by one or more first end users 105a. For purposes of discussion, at this point in method 300, there is only one application package deployed on the system.

In step 315, in response to one or more first end users 105a signing on to the enterprise server 115 and requesting access to the application package, the enterprise server 115 then controls and provides the one or more first end users 105a with access to the current version of the application package.

In one embodiment, the newest available version is identified by the spec.ini file 210 or another type of configuration file that may be used to contain the version information. This file identifies the package name of the newest version, which at this point in method 300 is "Package A." In this manner, when a user starts a session and requests access to the application, the kernel in enterprise server 115 identifies the current/newest application package by accessing the spec.ini file. The kernel can then allow and control the user's access to the current/newest application package instead of an older version that may also be simultaneously active. The one or more first end users 105a can then access the application features, which in this example is from Package A.

At block 320, at some future time that is subsequent to the deployment of the current application (Package A), it is decided that the current application needs to be modified for some reason (e.g., fixing bugs, adding features, removing features, replacing code, etc.). A modified version of the application package (e.g., Package B) is created offline. Once the modified version is ready for deployment, a system administrator stores the modified version of the application package in a directory in the storage device 120 based on the same pathcode of the current application, as described previously. As discussed above, the current version (e.g., Package A) is stored in a different directory than the modified version (Package B), but both versions are stored on the same storage device 120. The modified version is given a different package name than that of the current version of the application package so that both versions exist on the same server system (e.g., the same storage device/file system). As such, the same kernel process (same kernel process name) from the enterprise server 115 can deploy both the current version and the modified version (although at different deployment times) since the kernel has access to same file system. For example, kernel process XYZ can deploy first package version at a first time on server 115, and then kernel process XYZ can deploy second package version at a second time on server 115.

Furthermore, in step 320, after the modified version of the application package has been stored, the modified version of the application is deployed on the enterprise server 115. Once the modified version is deployed, the modified version (Package B) becomes the newest version of the application package. Package A is now the older version. The system then updates the spec.ini file (or another defined configuration file) to identify the newest version, which is now "Package B." Since the current version of the application package (Package A) and the modified version of the application package (Package B) are now both simultaneously active on the enterprise server 115, this means that the modified version (Package B) is deployed and active on the enterprise server 115 while the one or more first users 105a still have access to Package A, the previous current version of the application package.

In step 325, after the modified version of the application package (Package B) is deployed, new users will be attempting to access the application package. In response to one or more second end users 105b signing on to the enterprise server 115 after the modified version of the application package is deployed, the enterprise server 115 checks the spec.ini file to identify the newest version of the application, which is now Package B. The server then controls and provides the one or more second end users 105b with access to Package B, the modified version of the application package.

Accordingly, the previous current version (Package A) and the modified version (Package B) of the application package are simultaneously active on the enterprise server 115. Furthermore, two different sets of users are accessing different versions of the application simultaneously. Thus, the modified version (Package B) was deployed while Package A is still online without any downtime of the application. No users that are accessing Package A are disconnected from Package A and they may continue to use Package A as long as the user remains signed on. However, subsequent end users that sign on to access the application (after the modified version is deployed) are only given access to the modified version (Package B) and are not permitted access to the previous current version (Package A).

In step 330, the enterprise server 115 continues to provide access to the previous current version (Package A) of the application package to the first end users 105a (that signed on prior to the deployment of the modified version) while at least one or more first end users 105a remain signed on. For example, as long as a first user remains signed on to their original session, the system gives the first user access only to the previous current version (Package A) of the application (which is now the older version of the application).

In one embodiment, the system monitors the number of users that are signed on and accessing each different package version. The monitoring determines if any users are still accessing the previous current version (Package A) of the application. As long as one user from the first users 105a remains signed on and has access to Package A, Package A is maintained by the system as an active application. As such, no user experiences a downtime with Package A.

By monitoring the users who are accessing each package version, the enterprise server 115 can then detect when the last user signs out of the previous current version Package A (e.g., none of the one or more first users 105a remain signed on to the previous current version of the application). This means that the previous current version (Package A) is no longer being used or accessed. Recall that any new users that access the application are given access to Package B, the modified version of the application. Thus, the previous current application (Package A) can now be deactivated and deleted from the storage device 120.

In step 335, in response to detecting that all of the one or more first end users 105a have signed out of their respective sessions, the enterprise server 115 deletes the previous current version (Package A) of the application package. The modified version (Package B) of the application package is now the only active version and newest version of the application package. Once another modified version (Package C) of the application is deployed, the deployment and monitoring process repeats.

In one embodiment, with the present deployment technique, when deployment of a new application package (Package B) occurs, the newly deployed package (Package B) becomes active. The active package is specified via a configuration file that includes the package name. The older package (the previous current version (Package A)) still exists and is also active. During client initialization, the system sends the package name to the enterprise server 115 so that the enterprise server 115 knows what package application version to use when servicing new client requests to access the application. When a request occurs after the deployment of the new package (Package B), then the package name of the new version (Package B) is sent to the enterprise server 115. The enterprise server 115 then controls the access requests only to the new version of the application package (Package B).

The separation of application package data on the enterprise server 115 is accomplished by storing the application package specifications and logic in separate package-specific directories, as described previously. As a result, the enterprise server processes (e.g., kernels) are able to load the appropriate application package specifications and logic in the same or different processes. The kernels can load multiple application package versions for the same pathcode. Furthermore, since older application package versions are simultaneously maintained as active on the system, clients/users can continue to use the older application package versions. Accordingly, no halting or downtime of an application occurs during deployment of a new application version.

Computing Device Embodiment

Figure 4:
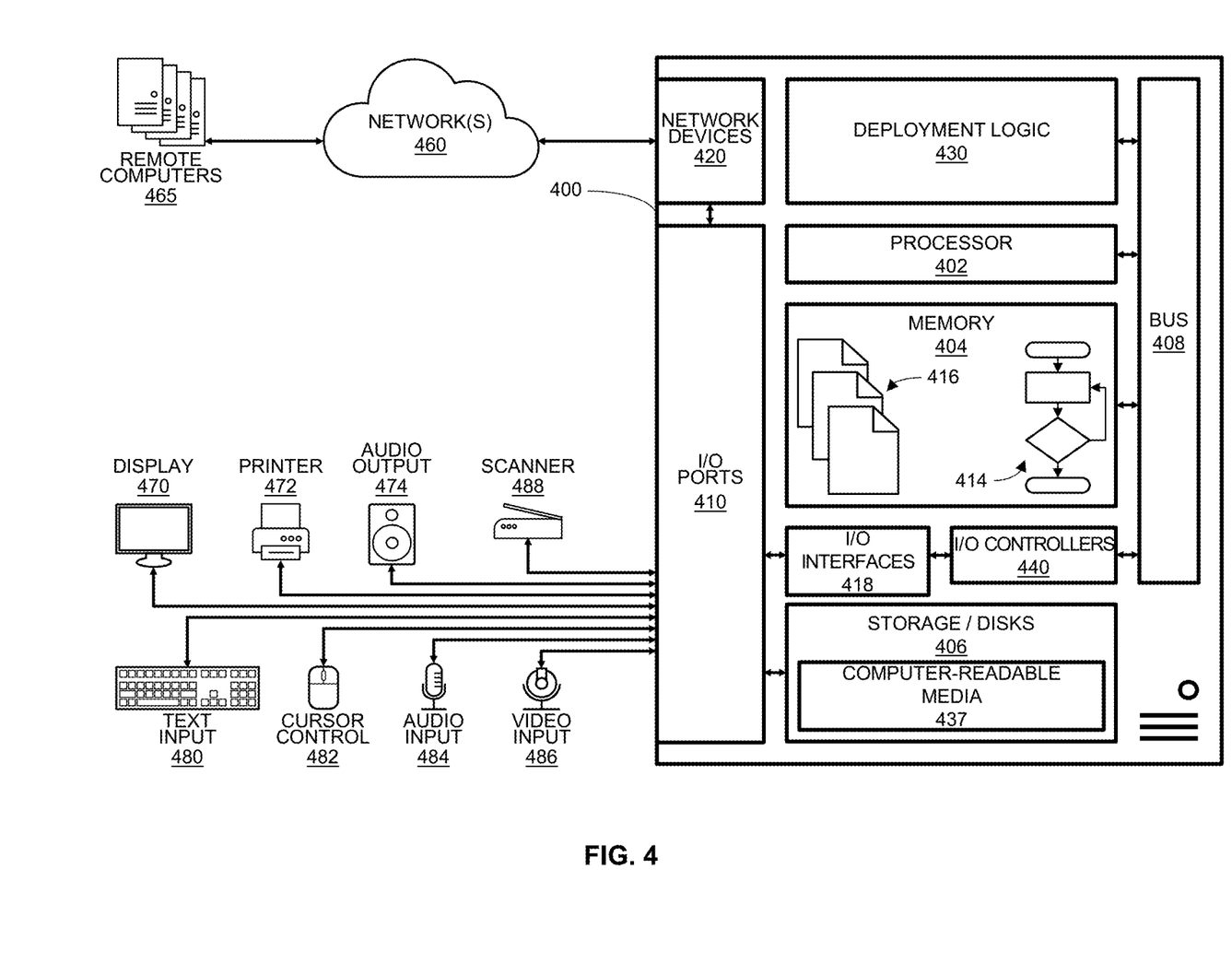
FIG. 4 illustrates an embodiment of a computing system configured with the example systems and/or methods disclosed.

FIG. 4 illustrates an example computing device that is configured and/or programmed as a special purpose computing device with one or more of the example systems and methods described herein, and/or equivalents. The example computing device may be a computer 400 that includes a processor 402, a memory 404, and input/output ports 410 operably connected by a bus 408. In one example, the computer 400 may include deployment logic 430 configured to facilitate the deploying of a modified application package similar to logic/system 100 shown in FIGS. 1, 2, and 3. In different examples, the deployment logic 430 may be implemented in hardware, a non-transitory computer-readable medium 437 with stored instructions, firmware, and/or combinations thereof. While the logic 430 is illustrated as a hardware component attached to the bus 408, it is to be appreciated that in other embodiments, the deployment logic 430 could be implemented in the processor 402, stored in memory 404, or stored in disk 406.

In one embodiment, deployment logic 430 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to deploy a modified application package. The means may also be implemented as stored computer executable instructions that are presented to computer 400 as data 416 that are temporarily stored in memory 404 and then executed by processor 402.

Logic 430 may also provide means (e.g., hardware, non-transitory computer-readable medium that stores executable instructions, firmware) for performing the deploying of a modified application package.

Generally describing an example configuration of the computer 400, the processor 402 may be a variety of various processors including dual microprocessor and other multi-processor architectures. A memory 404 may include volatile memory and/or non-volatile memory. Non-volatile memory may include, for example, ROM, PROM, EPROM, EEPROM and so on. Volatile memory may include, for example, RAM, SRAM, DRAM, and so on.

A storage disk 406 may be operably connected to the computer 400 via, for example, an input/output (I/O) interface (e.g., card, device) 418 and an input/output port 410 that are controlled by at least an input/output (I/O) controller 440. The disk 406 may be, for example, a magnetic disk drive, a solid state disk drive, a floppy disk drive, a tape drive, a Zip drive, a flash memory card, a memory stick, and so on. Furthermore, the disk 406 may be a CD-ROM drive, a CD-R drive, a CD-RW drive, a DVD ROM, and so on. The memory 404 can store a process 414 and/or a data 416, for example. The disk 406 and/or the memory 404 can store an operating system that controls and allocates resources of the computer 400.

The computer 400 may interact with input/output (I/O) devices via the input/output (I/O) controller 440, the I/O interfaces 418 and the input/output ports 410. Input/output devices may be, for example, a keyboard, a microphone, a pointing and selection device, cameras, video cards, displays 470, the disk 406, the network devices 420, printer 472, audio output 474, scanner 488, text input 480, cursor control 482, audio input 484, video input 486, and so on. The input/output ports 410 may include, for example, serial ports, parallel ports, and USB ports.

The computer 400 can operate in a network environment and thus may be connected to the network devices 420 via the I/O interfaces 418, and/or the I/O ports 410. Through the network devices 420, the computer 400 may interact with a network 460. Through the network 460, the computer 400 may be logically connected to remote computers 465. Networks 460 with which the computer 400 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A method performed by an enterprise server including at least one processor, the method comprising:
   storing a current version of an application package in a first directory;
   deploying on an enterprise server, by the processor, the current version of the application package from the first directory;
   in response to one or more first users signing on to the enterprise server, controlling and providing the one or more first users with access to the current version of the application package;
   storing a modified version of the application package in a second directory on the enterprise server;
   deploying on the enterprise server, by the processor, the modified version of the application package from the second directory;
   wherein the modified version of the application package is deployed while the one or more first users have access to the current version of the application package;
   in response to a second user signing on to the enterprise server after the modified version of the application package is deployed, controlling and providing the second user with access to the modified version of the application package;
   wherein the current version and the modified version of the application package are simultaneously active on the enterprise server, and wherein subsequent users that sign on are only given access to the modified version of the application package and are not permitted access to the current version of the application package;
   continuing to provide access to the current version of the application package to the one or more first users while the one or more first users remain signed on; and
   in response to all of the one or more first users being signed out, deleting the current version of the application package and causing the modified version of the application package to become a new current version of the application package.

2. The method of claim 1, further comprising:
   configuring files of the current version of the application package in the first directory on the enterprise server, wherein the current version of the application package is identified by a first package name, and wherein the first directory is located by a combination of a pathcode and the first package name; and
   configuring files of the modified version of the application package in the second directory on the enterprise server, wherein the modified version of the application package is identified by a second package name, and wherein the second directory is located by a combination of the pathcode and the second package name.

3. The method of claim 2, further comprising:
   identifying the current version of the application package by a specification initialization file, a current package file, and a current package business function dynamic link library file.

4. The method of claim 1, wherein the method further comprises:
   maintaining a configuration file that identifies the current version of the application package as a newest version of the application package after the current version of the application package is deployed; and
   updating the configuration file to identify the modified version of the application package as the newest version of the application package after the modified version of the application package is deployed.

5. The method of claim 1, wherein the method further comprises:
   storing the current version of the application package and the modified version of the application package on a storage device so that both the current version and the modified version of the application package co-exist on same storage device.

6. The method of claim 5, wherein the method further comprises:
   deploying both the current version and the modified version of the application package by the enterprise server using a same kernel process.

7. The method of claim 1, wherein the method further comprises:
   monitoring a number of the one or more first users that remain signed on that are accessing the current version of the application package;
   detecting when none of the one or more first users remain signed on; and
   in response to detecting when none of the one or more first users remain signed on, deleting the current version of the application package from the first directory.

8. A non-transitory computer-readable storage medium storing computer-executable instructions that, when executed by a computer including a processor, cause the computer to perform functions configured by the computer-executable instructions, wherein the instructions comprise:
   store a current version of an application package in a first directory;
   deploy on an enterprise server, by the processor, the current version of the application package from the first directory;
   in response to one or more first users signing on to the enterprise server, control and provide the one or more first users with access to the current version of the application package;
   store a modified version of the application package in a second directory on the enterprise server;
   deploy on the enterprise server, by the processor, the modified version of the application package from the second directory;
   wherein the modified version of the application package is deployed while the one or more first users have access to the current version of the application package;
   in response to a second user signing on to the enterprise server after the modified version of the application package is deployed, control and provide the second user with access to the modified version of the application package;
   wherein the current version and the modified version of the application package are simultaneously active on the enterprise server, and wherein subsequent users that sign on are only given access to the modified version of the application package and are not permitted access to the current version of the application package;
   continue to provide access to the current version of the application package to the one or more first users while the one or more first users remain signed on; and
   in response to all of the one or more first users being signed out, delete the current version of the application package and cause the modified version of the application package to become a new current version of the application package.

9. The non-transitory computer-readable storage medium of claim 8, further comprising instructions that, when executed by at least the processor, cause the processor to:
   configure files of the current version of the application package in the first directory on the enterprise server, wherein the current version of the application package is identified by a first package name, and wherein the first directory is located by a combination of a pathcode and the first package name; and
   configure files of the modified version of the application package in the second directory on the enterprise server, wherein the modified version of the application package is identified by a second package name, and wherein the second directory is located by a combination of the pathcode and the second package name.

10. The non-transitory computer-readable storage medium of claim 8, further comprising instructions that, when executed by at least the processor, cause the processor to:
   identify the current version of the application package by a specification initialization file, a current package file, and a current package business function dynamic link library file.

11. The non-transitory computer-readable storage medium of claim 8, further comprising instructions that, when executed by at least the processor, cause the processor to:
   maintain a configuration file that identifies the current version of the application package as a newest version of the application package after the current version of the application package is deployed; and
   update the configuration file to identify the modified version of the application package as the newest version of the application package after the modified version of the application package is deployed.

12. The non-transitory computer-readable storage medium of claim 8, further comprising instructions that, when executed by at least the processor, cause the processor to:
   store the current version of the application package and the modified version of the application on a storage device so that both the current version and the modified version of the application package co-exist on same storage device.

13. The non-transitory computer-readable storage medium of claim 12, further comprising instructions that, when executed by at least the processor, cause the processor to:
   deploy both the current version and the modified version of the application package by the enterprise server using a same kernel process.

14. The non-transitory computer-readable storage medium of claim 8, further comprising instructions that, when executed by at least the processor, cause the processor to:
   monitor a number of the one or more first users that remain signed on that are accessing the current version of the application package;
   detect when none of the one or more first users remain signed on; and
   in response to detecting when none of the one or more first users remain signed on, delete the current version of the application package from the first directory.

15. A computing system, comprising:
   at least one processor connected to at least one memory;
   a non-transitory computer readable storage medium including instructions stored thereon that, when executed by the at least one processor, cause the at least one processor to:
   store a first version of an application package in a first location on an enterprise server;
   deploy on the enterprise server, by the processor, the first version of the application package from the first location;
   in response to one or more first users signing on to the enterprise server, control and provide the one or more first users with access to the first version of the application package;
   store a second version of the application package in a second location on the enterprise server;
   deploy on the enterprise server, by the processor, the second version of the application package from the second location;
   wherein the second version of the application package is deployed while the one or more first users have access to the first version of the application package;
   in response to a second user signing on to the enterprise server after the second version of the application package is deployed, control and provide the second user with access to the second version of the application package;
   wherein the first version and the second version of the application package are simultaneously active on the enterprise server, and wherein subsequent users that sign on are only given access to the second version of the application package and are not permitted access to the first version of the application package;

continue to provide access to the first version of the application package to the one or more first users while the one or more first users remain signed on; and in response to all of the one or more first users being signed out, delete the first version of the application package and cause the second version of the application package to become a new current version of the application package.

16. The computing system of claim 15, wherein the instructions further include instructions that, when executed by at least the processor, cause the processor to:

configure files of the first version of the application package in the first location on the enterprise server, wherein the first version of the application package is identified by a first package name, and wherein the first location is identified by a combination of a pathcode and at least a portion of the first package name; and configure files of the second version of the application package in the second location on the enterprise server, wherein the second version of the application package is identified by a second package name, and wherein the second location is identified by a combination of the pathcode used in the first location and at least a portion of the second package name.

17. The computing system of claim 15, wherein the instructions further include instructions that, when executed by at least the processor, cause the processor to:

maintain a configuration file that identifies the first version of the application package as a newest version of the application package after the first version of the application package is deployed; and update the configuration file to identify the second version of the application package as the newest version of the application package after the second version of the application package is deployed.

18. The computing system of claim 15, wherein the instructions further include instructions that, when executed by at least the processor, cause the processor to:

store the first version of the application package and the second version of the application on a storage device so that both the first version and the second version of the application package co-exist on same storage device.

19. The computing system of claim 18, wherein the instructions further include instructions that, when executed by at least the processor, cause the processor to:

deploy both the first version and the second version of the application package by the enterprise server using a same kernel process.

20. The computing system of claim 15, wherein the instructions further include instructions that, when executed by at least the processor, cause the processor to:

monitor a number of the one or more first users that remain signed on that are accessing the first version of the application package;

detect when none of the one or more first users remain signed on; and in response to detecting when none of the one or more first users remain signed on, delete the first version of the application package from the first location.

* * * * *